(12) United States Patent
Rysinski et al.

(10) Patent No.: US 7,755,684 B2
(45) Date of Patent: Jul. 13, 2010

(54) ROW DRIVER CIRCUITRY FOR IMAGING DEVICES AND RELATED METHOD OF OPERATION

(75) Inventors: Jeffrey Rysinski, Boise, ID (US); Sanjayan Vinayagamoorthy, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 774 days.

(21) Appl. No.: 11/511,746

(22) Filed: Aug. 29, 2006

(65) Prior Publication Data

US 2008/0074519 A1 Mar. 27, 2008

(51) Int. Cl.
*H04N 3/14* (2006.01)

(52) U.S. Cl. ........................ 348/294; 348/308

(58) Field of Classification Search ................. None
See application file for complete search history.

(56) References Cited

U.S. PATENT DOCUMENTS

| | | | |
|---|---|---|---|
| 5,144,447 A | 9/1992 | Akimoto et al. | |
| 5,469,484 A | 11/1995 | Sato et al. | |
| 5,646,550 A * | 7/1997 | Campbell et al. | 326/81 |
| 6,140,630 A | 10/2000 | Rhodes | |
| 6,323,476 B1 | 11/2001 | Guidash et al. | |
| 6,768,093 B2 | 7/2004 | Miida | |
| 6,787,751 B2 * | 9/2004 | Tanimoto | 250/208.1 |
| 6,900,484 B2 | 5/2005 | Rhodes | |
| 6,937,278 B2 | 8/2005 | Huang et al. | |
| 6,972,399 B2 | 12/2005 | Barna | |
| 7,042,031 B2 | 5/2006 | Watanabe | |
| 7,053,945 B1 * | 5/2006 | Xue | 348/294 |
| 7,233,353 B2 * | 6/2007 | Xue | 348/294 |
| 2002/0140689 A1 | 10/2002 | Huang et al. | |
| 2003/0174226 A1 | 9/2003 | Ahn et al. | |
| 2004/0036787 A1 | 2/2004 | Barna | |
| 2004/0108525 A1 | 6/2004 | Sekine | |
| 2005/0001917 A1 | 1/2005 | Berezin et al. | |
| 2006/0056264 A1 * | 3/2006 | Worley et al. | 365/230.06 |
| 2006/0092316 A1 | 5/2006 | Gazeley | |
| 2006/0097132 A1 | 5/2006 | Nam et al. | |
| 2006/0097296 A1 | 5/2006 | Nam | |
| 2006/0119720 A1 | 6/2006 | Hong | |
| 2007/0046800 A1 * | 3/2007 | Chen et al. | 348/308 |

OTHER PUBLICATIONS

PCT International Search Report, mailed May 8, 2008, International Application No. PCT/US2007/076683 (4 pages).

* cited by examiner

*Primary Examiner*—David L Ometz
*Assistant Examiner*—Angel L Garces-Rivera
(74) *Attorney, Agent, or Firm*—TraskBritt

(57) ABSTRACT

Row drivers as a part of an image sensor device include circuitry for supplying a plurality of signals with an increased voltage and enhanced reliability to a corresponding row in a pixel array. The row driver circuitry is designed to input a signal such as row select, reset or transfer and additionally input a boosted voltage supply. The row select, reset, or transfer signal is then output with a boosted voltage that is higher than the operating voltage supply. The row driver circuit is configured so that all terminal voltages across any of the plurality of transistors within the row driver circuit are less than or equal to the operating voltage supply.

27 Claims, 6 Drawing Sheets

ROW DRIVER CIRCUITRY FOR IMAGING DEVICES AND RELATED METHOD OF OPERATION

BACKGROUND OF THE INVENTION

1. Field of the Invention

The present invention relates generally to an imaging device and, more specifically, to an image sensor containing row drivers of enhanced reliability configured to transmit a signal with a higher than nominal operating voltage.

2. State of the Art

An image sensor is a semiconductor device with the capacity to convert an optical image into an electrical signal. Image sensors are used in a variety of imaging applications including medical products, navigational equipment, and consumer products such as digital cameras and cellular phones.

Image sensors include an array of photo-sensitive devices such as photodiodes or photo-transistors fabricated on, for example, a complementary metal oxide semiconductor (CMOS) device. Each photo-sensitive device is sensitive to light in such a way that it can create an electrical current that is proportional to the intensity of light striking the photo-sensitive device. The overall image captured by an image sensor is comprised of multiple pixels in an array, arranged in rows and columns, such that each pixel detects the light intensity at the location of that pixel. Each row in the pixel array may include a row driver configured to send a plurality of signals to an identified pixel or row of pixels. For example, if an image sensor includes one thousand rows, one thousand row drivers may be required. The plurality of signals may include a row selection signal, a reset signal and a transfer signal. Upon receipt of a signal, the pixel array may perform various functions on the identified pixels including selecting, resetting, or transferring the charge of one or more identified pixels in an identified pixel row.

Currently, for improved performance, it is common practice for the reset and transfer gate pixel signals to be amplified by a voltage boost which is greater than an operating voltage supply. The term "boost" and its derivatives are used throughout this specification to indicate a voltage or a generation of a voltage which is higher than the operating voltage supply.

As stated, increasing the voltage on the pixel signals improves the performance of the imaging sensor. One enhancement involves the gating operation of the row select, reset, and transfer transistors. In particular, by increasing the voltage to one or more of the gates of the row select, reset, and transfer transistors, it is possible to avoid pixel to pixel fabrication differences in electrical characteristics of these transistors. Additionally, by boosting the voltage of the reset signal, the dynamic range of the sensor pixels can be increased without increasing the supply voltage. Dynamic range refers to the range of incident light that can be accommodated by an image sensor in a single frame of pixel data. However, boosting the voltage can cause reliability problems with the transistors. In particular, a boosted voltage can cause terminal voltages of the transistor to be greater than the operating voltage supply of the system. Examples of terminal voltages may include a gate-to-source, a gate-to-drain, or a drain-to-source voltage. Transistors operated at voltages higher than the normal operating voltage supply have a far greater failure rate due to lower device reliability than transistors operating at, or lower than, the operating voltage supply.

Based on the foregoing, there remains a need for an imaging device containing row drivers which are capable of overcoming the disadvantages delineated above. In particular, a need exists for row drivers that are able to supply a signal with a boosted voltage to a pixel array's row select, reset, and transfer gates, while not allowing the terminal voltages of the transistors in the row driver circuit to exceed the operating voltage supply.

BRIEF DESCRIPTION OF THE DRAWINGS

In the drawings, which illustrate what is currently considered to be the best mode for carrying out the invention.

DETAILED DESCRIPTION OF THE INVENTION

Figure 1:
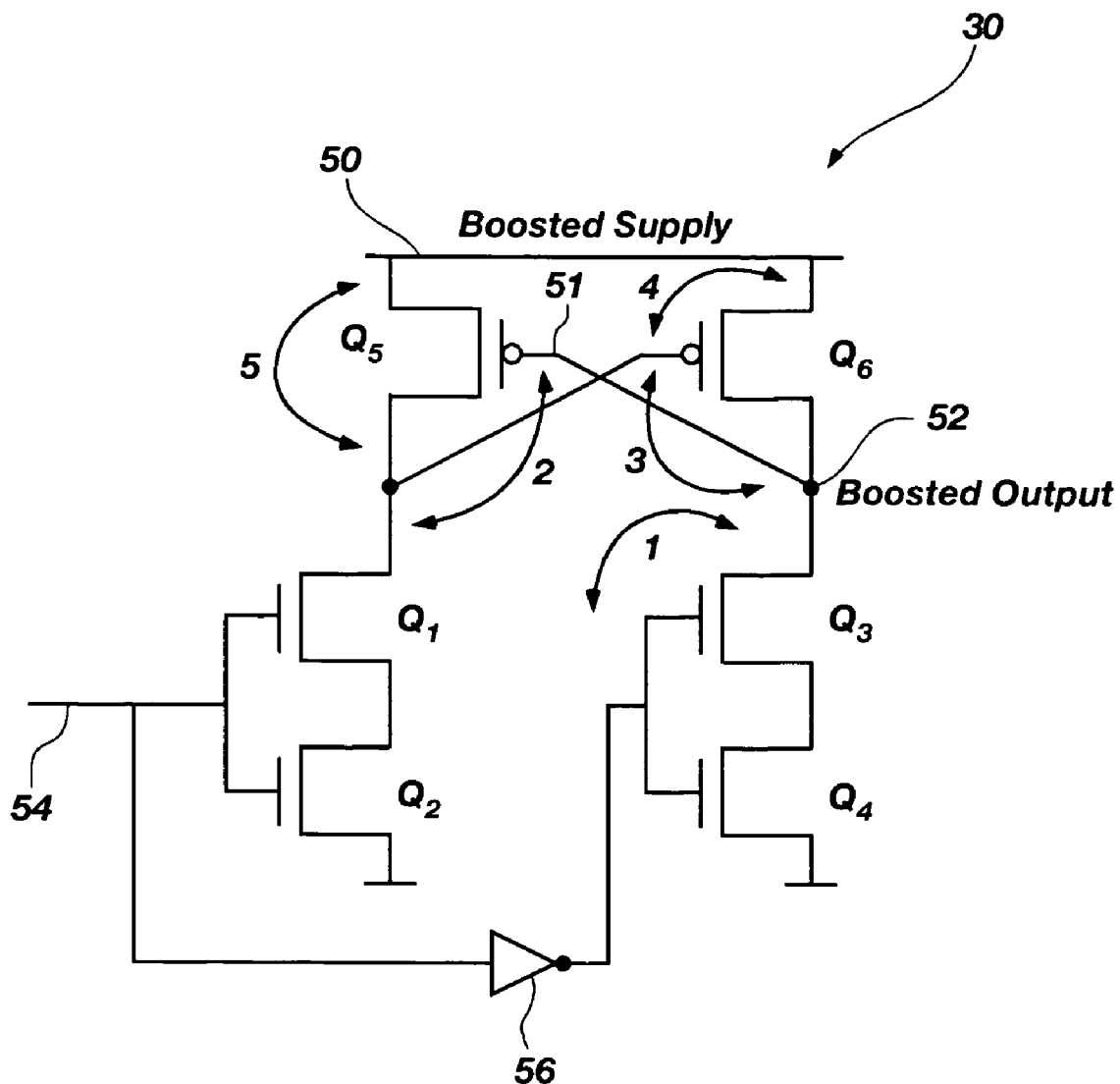
FIG. 1 is a circuit diagram of a prior art row driver circuit.

There is a need for an image sensor with row drivers that are able to supply reset and transfer signals as well as row select signals, with a boosted voltage, to a pixel array while not allowing the terminal voltages of the transistors in the row driver circuit to exceed the operating voltage supply.

The present invention provides apparatus and a method of operation for an imaging sensor device including row driver circuitry that solves reliability concerns associated with operating transistors at voltages higher than an operating voltage supply.

A representative embodiment of the invention includes a row driver circuit including an operating voltage supply and a boosted voltage supply. The boosted voltage supply includes a voltage that is larger than the operating voltage supply by a boosted amount. The row driver circuit also includes a pre-driver coupled to the operating voltage supply and configured to generate a driver voltage that is at least the boosted amount above a reference voltage. Additionally, the pre-driver is configured to receive an input signal. The row driver circuit also includes a first transistor that is coupled in series between a second transistor and the ground voltage. The gate of the first transistor is configured to receive an input signal. The second transistor is operably coupled in series between the first transistor and an output signal and configured to conduct and to generate a drain-to-source voltage drop of at least the boosted amount. Additionally, the row driver circuit includes a third transistor operably coupled between the boosted voltage supply and the output signal. The gate of the third transistor is configured to receive the driver voltage from the pre-driver.

Another representative embodiment of the invention comprises a method of operating a row driver circuit. The method includes inputting a voltage supply and an input signal to a pre-driver. The method further includes generating a driver voltage from the pre-driver that is at least a boosted amount above a reference voltage. Additionally, the method includes generating an output signal. Generating the output signal comprises inputting the input signal into the gate of the first transistor and supplying a boosted voltage to the source of a third transistor which is operably coupled to the output node. The boosted voltage is larger than the voltage supply by the boosted amount. Generating the output signal also includes configuring a second transistor to conduct and to generate a drain-to-source voltage drop of at least the boosted amount. The second transistor is operably coupled to the output node. Furthermore, generating the output signal includes operably coupling the driver voltage to the gate of the third transistor.

Another representative embodiment of the invention comprises a method of operating a row driver circuit. The method includes inputting a voltage supply and an input signal to a pre-driver and generating a driver voltage from the pre-driver that is at least a boosted amount above a reference voltage. The method further includes generating a boosted voltage on an output signal when the input signal is negated and generating a voltage that is substantially near the ground voltage on the output signal when the input signal is asserted.

Another representative embodiment of the invention comprises an image sensor device including the previously defined row driver circuit, an array of pixels arranged on a semiconductor device wherein each pixel is configured for sensing light incident on the pixel, and a plurality of buses, each bus coupled to the pixels in a row of the pixel array and configured to transmit the output of the row driver circuit to an array of pixels.

Throughout this description it is assumed that the operating voltage supply is equal to about 3.0 volts. When the boosted supply is asserted, the boosted voltage supply rises to about 3.8 volts. When the boosted supply is negated, the boosted supply voltage drops to about 3.0 volts. With boosted supply in the asserted state, the difference between the two supply voltages (operating voltage supply and boosted voltage supply) is about 0.8 volts, and is hereinafter referred to as a boosted amount. Those of ordinary skill in the art will recognize that the numerical values of the operating voltage supply and the boosted voltage supply are representative embodiments and are not used for the purposes of limitation.

In this description, circuits and functions may be shown in block diagram form in order not to obscure the present invention in unnecessary detail. Conversely, specific circuit implementations shown and described are exemplary only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations, and the like, have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

The terms "assert" and "negate" are respectively used when referring to the rendering of a signal, status bit, or similar apparatus into its logically true or logically false state. If the logically true state is a logic level one, the logically false state will be a logic level zero. Conversely, if the logically true state is a logic level zero, the logically false state will be a logic level one.

FIG. 1 is a prior art circuit diagram of conventional row driver circuitry 30. The row driver circuitry 30 includes boosted voltage supply 50, output node 52, and input node 54. Row driver circuitry 30 also includes two positive metal oxide semiconductor (PMOS) transistors Q5, Q6, four negative metal oxide semiconductor (NMOS) transistors Q1, Q2, Q3, Q4, and an inverter 56. When input node 54 is negated, PMOS transistor Q6 will be closed and the voltage at the output node 52 will be zero. When input node 54 is asserted, or set to high, output node 52 is going to be equal to boosted voltage supply 50. Conventional row driver circuitry 30 includes a feedback loop 51 connecting output node 52 to the gate of PMOS transistor Q5. Using feedback loop 51 can be disadvantageous in the case in which output node 52 has slow rising and falling edges due to high capacitive loading. This causes transistor Q5 to remain in a conductive or non-conductive state, respectively, which impedes the transition of the output node 52. As a result, another stage is now required to buffer the output.

Furthermore, using this circuit design and operation, the gate-to-drain voltage of transistor Q3 (arrow 1) is 3.8 volts when the output node is high. The gate-to-source (arrow 4) terminal voltage of transistor Q6 is 3.8 volts. The drain-to-source (arrow 5) and the gate-to-drain (arrow 2) terminal voltages of transistor Q5 are 3.8 volts when output node 52 is low. These terminal voltages are obviously higher than the operating voltage supply of 3.0 volts thus putting a strain on the reliability of the transistors Q3, Q5, and Q6.

Figure 2:
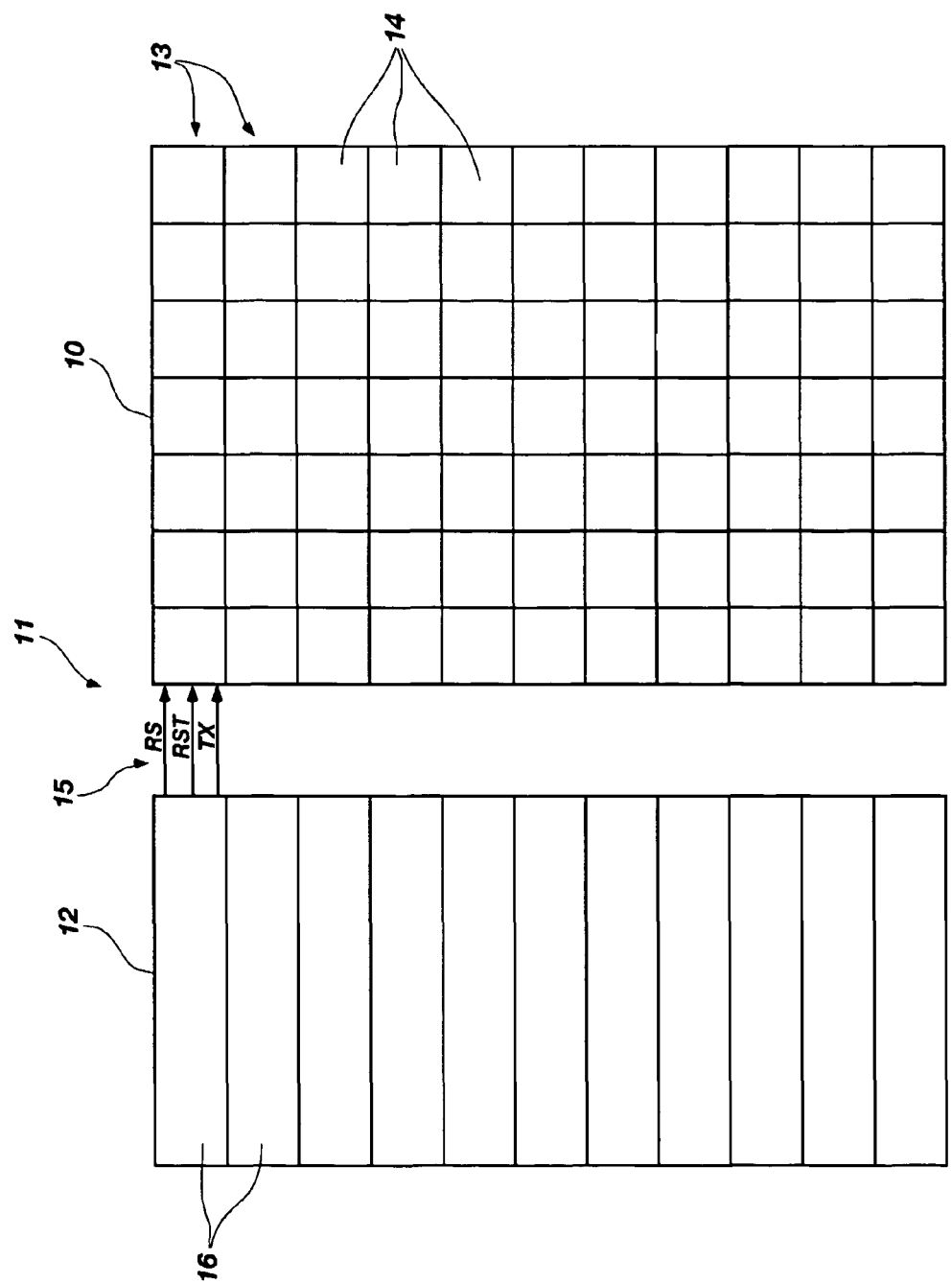
FIG. 2 is a simplified block diagram of an imaging system including an image sensor with a pixel array and a row driver in accordance with a representative embodiment of the invention.

FIG. 2 is a simplified block diagram of an image sensor 11 with a pixel array 10, bank of row drivers 12, and a plurality of signals 15. Pixel array 10 includes a row-by-column grid of individually addressable pixels 14. Each individual row driver 16 includes circuitry for generating a signal to pixel array 10 to enable or select (RS) the pixels 14 in a corresponding row 13. Row driver 16 also includes circuitry for generating a signal to the pixel array 10 to reset (RST) one or more of the pixels 14 in a corresponding row 13. RST forces the specified pixels 14 to a black level (i.e., high voltage) in order to reset the pixels 14 for subsequent integration. Additionally, row drivers 16 include circuitry for generating a signal to the pixel array 10 to transfer (TX) the charge in one or more of the pixel's 14 photodiodes to a diffusion node (not shown).

Figure 3:
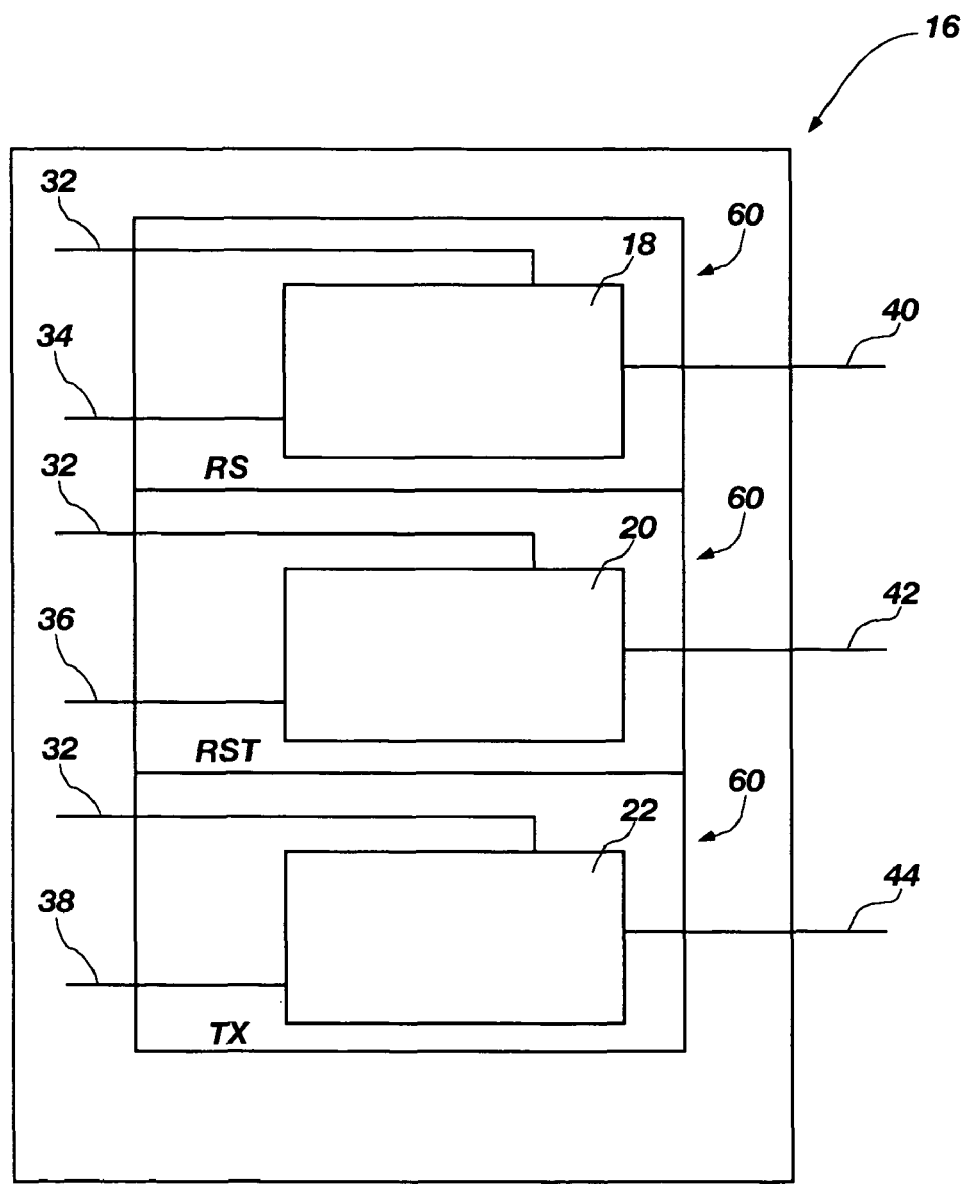
FIG. 3 is a simplified block diagram of a row driver in accordance with a representative embodiment of the invention.

FIG. 3 is a block diagram of a row driver 16 with row driver circuits 60. Each row driver circuit 60 corresponds to a specific function including RS, RST or TX. Therefore, row driver circuit 60 includes three separate circuits 18, 20, and 22. Each circuit 18, 20, 22 receives a boosted voltage supply 32. Circuit 18 receives a RS signal input 34 and a boosted voltage supply 32 and drives the RS signal output 40 to the pixel array 10 (FIG. 2). Circuit 20 receives a RST signal input 36 and a boosted voltage supply 32 and drives the RST signal 42 to the pixel array 10 (FIG. 2). Circuit 22 receives a TX signal input 38 and a boosted voltage supply 32 and drives the TX signal 44 to the pixel array 10 (FIG. 2). Boosted voltage supply 32 may contain the same voltage boost for each circuit 18, 20, 22, or may be different, depending on each of the circuit 18, 20, 22 requirements.

Figure 4:
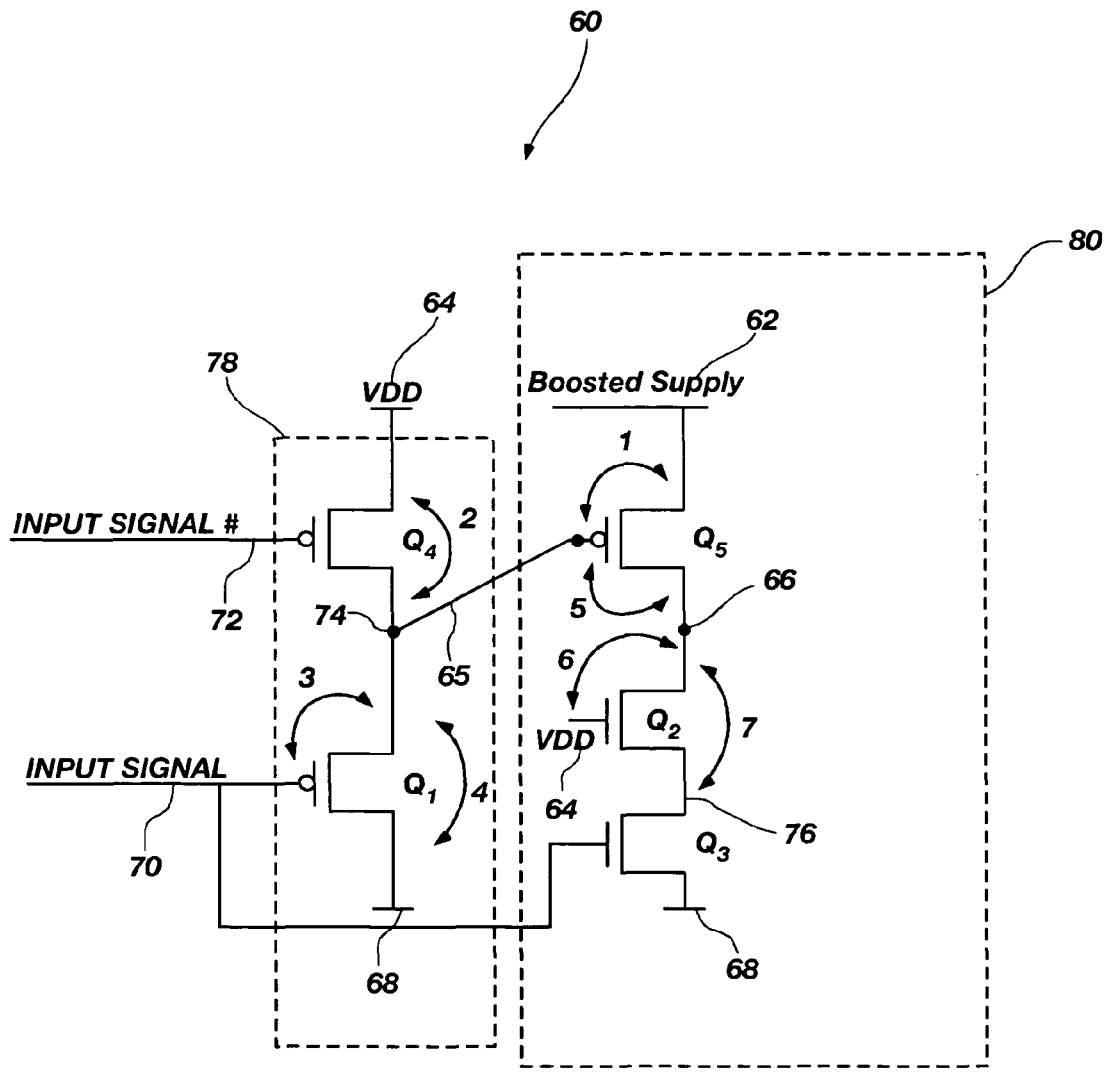
FIG. 4 is an exemplary circuit diagram of a row driver circuit in accordance with a representative embodiment of the invention.

FIG. 4 is a circuit diagram of a row driver circuit 60 with an input signal 70 and an output signal node 66. Output signal node 66 is located between two transistors Q5 and Q2. By way of example and not limitation, transistor Q5 may be a PMOS transistor and transistor Q2 may be an NMOS transistor. Input signal 70 is inputted to pre-driver 78. By way of example only, pre-driver 78 may include a PMOS transistor Q1 and a PMOS transistor Q4 in series, in which input signal 70 is coupled to the gate of transistor Q1. Additionally, input signal 70 is connected to transistor Q3. By way of example and not limitation, transistor Q3 may be an NMOS transistor and receive input signal 70 at the gate.

Row driver circuit 60 also includes a voltage supply 64, connected to pre-driver 78, and a boosted voltage supply 62 connected to an output leg 80. Transistor Q2 may be configured to conduct and generate a source-to-drain voltage drop of at least a boosted amount. As previously defined, a boosted amount is the difference between the boosted voltage supply 62 and the operation voltage supply 64. By way of example only, voltage supply 64 is input into the source of PMOS transistor Q4 and the gate of NMOS transistor Q2.

Node 74 is located within pre-driver 78 and outputs a driver voltage 65 into transistor Q5. Because transistor Q1 has a threshold voltage of approximately a boosted amount, node 74 and driver voltage 65 have values that are above a reference voltage by at least a PMOS threshold voltage. By way of example only, the reference voltage may be a ground voltage. Keeping the driver voltage within this defined range ensures that the terminal voltages (arrows 1, 5) of transistor Q5 are less than or equal to the voltage supply 64. By way of example and not limitation, node 74 may be located between the drain of PMOS transistor Q4 and the source of PMOS transistor Q1 and is outputted to the gate of PMOS transistor Q5. Because driver voltage 65 does not fall all the way to zero, transistor Q5 does not fully conduct. However, transistor Q5 is designed to work in the triode region where resistance is inversely proportional to the driver voltage 65 in a linear manner. It may be ideal to keep the impedance of Q5 to a minimum so the linear increase in resistance from a reduction in overdrive voltage can be compensated by the same increase in the width-to-length (W/L) ratio of transistor Q5.

Node 76 is located between the NMOS cascode of transistors Q2 and Q3. The source of transistor Q3 and the drain of transistor Q1 are connected to ground voltage 68. Additionally, input signal#72 may be connected to pre-driver 78 and is an inverted version of input signal 70. By way of example only, the input signal#72 is connected to the gate of PMOS transistor Q4.

The operation of FIG. 4 will now be described. As shown, only the output leg 80 of row driver circuit 60 is connected to the boosted voltage supply 62 thus ensuring that each of the terminal voltages (arrows 2, 3, and 4) of the pre-driver 78 remain equal to or less than the voltage supply 64. Row driver circuit 60 does not include a feedback loop (as shown in FIG. 1), thus ensuring that a feedback loop does not impede a transition of the output node 66. When input signal 70 is negated, input signal#72 is asserted, node 74 is pulled to the threshold voltage of PMOS transistor Q1 (around 0.8 volts). Subsequently, PMOS transistor Q5 turns on and output signal node 66 increases to the boosted voltage supply 62. With node 74 and driver voltage 65 at approximately 0.8 volts, the gate-to-source and gate-to-drain terminal voltages (arrows 1, 5) of transistor Q5 range from 2.2 to 3.0 volts depending on whether boosted voltage supply 62 is at 3.0 or 3.8 volts, respectively. Additionally, NMOS transistor Q3 turns off, and the gate-to-drain terminal voltage (arrow 6) across NMOS transistor Q2 ranges from zero to 0.8 volts, also depending on whether the boosted voltage supply 62 is at 3.0 or 3.8 volts, respectively. The drain-to-source terminal voltage (arrow 7) across Q2 ranges from 0.3 and 1.1 volts, again depending on whether boosted voltage supply 62 is at 3.0 or 3.8 volts respectively. Therefore, node 76 has a voltage of approximately 2.7 volts and all terminal voltages (arrows 1-7) are all equal to or less than voltage supply 64, which increases the reliability of the transistors Q1-Q5 thus decreasing the failure rate of the row driver circuit 60.

Conversely, when input signal 70 is high and input signal#72 is low, PMOS transistor Q1 turns off and PMOS transistor Q4 begins to conduct, thus driving node 74 to voltage supply 64. With node 74 equal to voltage supply 64, PMOS transistor Q5 closes, NMOS transistors Q2 and Q3 are both conducting and output signal node 66 is driven to ground voltage 68. With output signal node 66 equal to zero, the gate-to-drain and drain-to-source terminal voltages (arrows 6, 7) across transistor Q2 are approximately 3.0 and 0 volts, respectively. With node 74 equal to voltage supply 64, the gate-to-source terminal voltage (arrow 1) of transistor Q5 is zero and the gate-to-drain terminal voltage (arrow 5) is approximately 3.0 volts. Thus, all terminal voltages (arrows 1-7) are all equal to or less than voltage supply 64, which increases the reliability of the transistors Q1-Q5 thus decreasing the failure rate of the row driver circuit 60.

Figure 5:
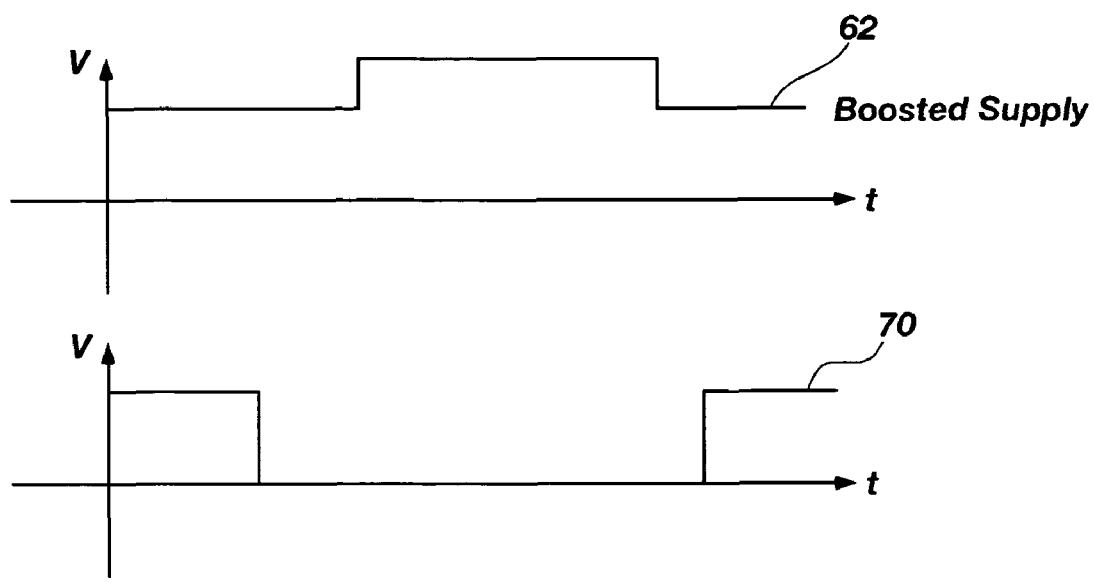
FIG. 5 is a timing diagram illustrating an input and a boosted voltage supply in accordance with the operation of the row driver circuit.

FIG. 5 is a timing diagram including input signal 70 and boosted voltage supply 62. As shown, input signal 70 is negated before the required time that the boosted voltage supply 62 is turned on and only enabled after the time the boosted voltage supply 62 is turned off. When input signal 70 is asserted, transistor Q5 is closed and boosted voltage supply 62 is blocked from output node 66 (FIG. 4). Therefore, boosted voltage supply 62 is raised only when input signal 70 is negated.

Figure 6:
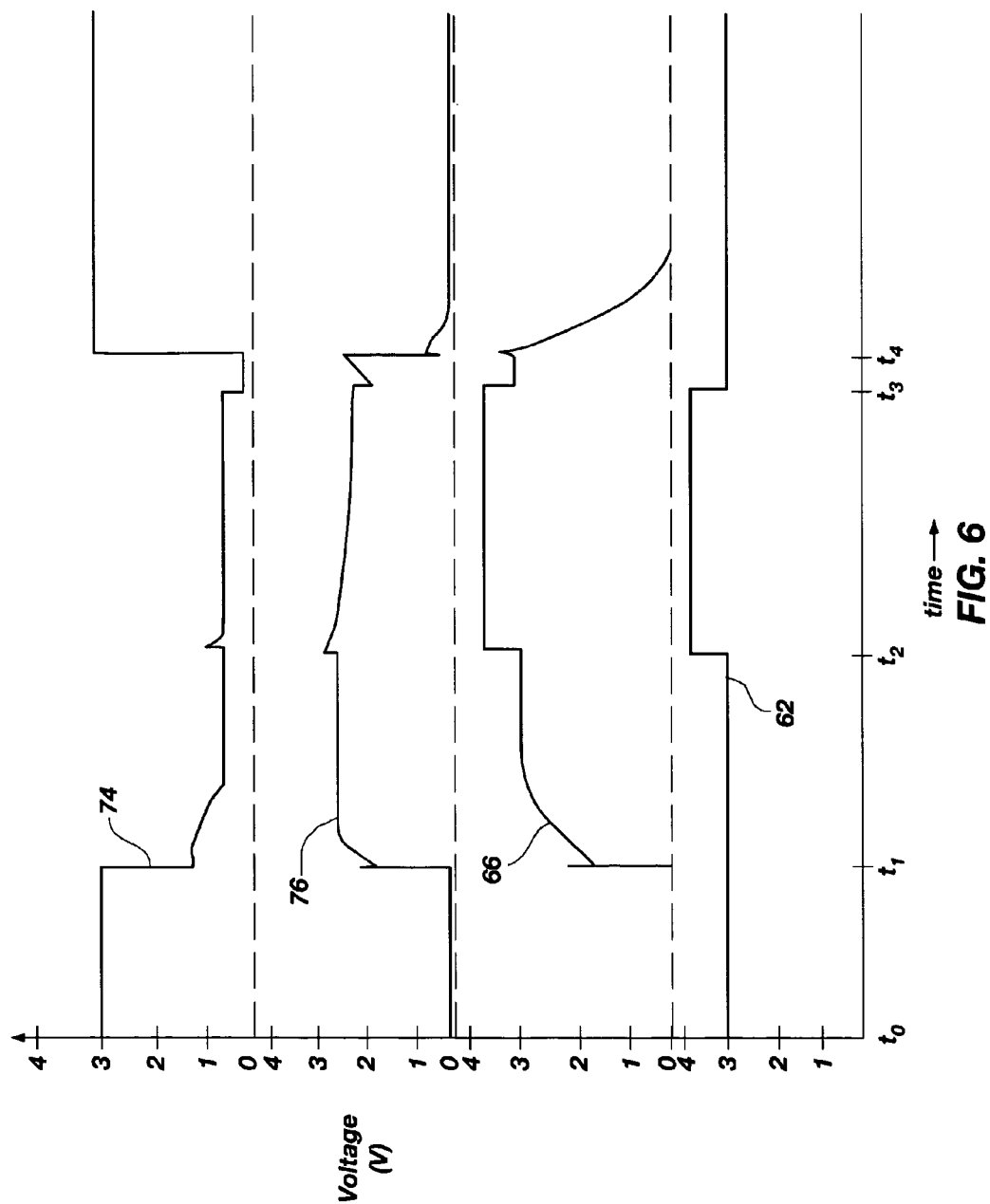
FIG. 6 is a timing diagram illustrating the voltages of the input and output signals of the row driver circuit as well as the voltages at specified nodes in the circuit.

FIG. 6 is a timing diagram showing voltage levels at nodes 74, 76, output node 66 and the boosted voltage supply 62 with respect to time. FIG. 6 will now be referred to in conjunction with the operation of row driver circuit 60 in FIG. 4. Initially, at time $t_0$, input signal 70 is asserted, thus negating input signal#72. With this initial configuration, transistor Q4 is conducting and node 74 is pulled to voltage supply 64. With input signal 70 asserted, transistor Q3 along with transistor Q2 are conducting. Transistor Q2 may be in a permanent conductive state because of the voltage supply 64 at the gate of transistor Q2. Therefore, node 76 goes to substantially near zero. With input signal#72 equal to the voltage supply 64, transistor Q5 is turned off, and node 66 goes to zero.

At time $t_1$, input signal 70 is negated, thus input signal#72 is asserted. With input signal#72 asserted, transistor Q4 is closed, transistor Q1 is conducting and node 74 begins to fall to the threshold voltage (approximately 0.8 volts) of PMOS transistor Q1. Additionally, with input signal 70 negated, transistor Q3 is turned off and node 76 begins to rise to a level of approximately 2.7 volts. With node 74 at a low voltage, transistor Q5 is conducting, output node 66 is connected to boost voltage supply 62 and begins to rise to a voltage level of 3.0 volts, about equal to the voltage level of boosted supply 62 at this time. At time $t_2$, boosted voltage supply 62 is raised from 3.0 to 3.8 volts and output node 66 increases from 3.0 volts to the boosted voltage supply voltage of 3.8 volts. As shown in FIG. 5, boosted voltage supply 62 is raised only after input signal 70 is negated. At time $t_3$, boosted voltage supply 62 is lowered back to 3.0 volts and output node 66 drops back down to the voltage supply of 3.0 volts.

At time $t_4$, input signal 70 is again asserted, thus negating input signal#72. With Q1 turned off and Q4 conducting, node 74 increases to the voltage supply 64. With input signal 70 asserted, transistor Q3 along with transistor Q2 are conducting. Therefore, node 76 goes to substantially near zero. With input signal#72 equal to the voltage supply 64, transistor Q5 is turned off and node 66 goes to zero. As shown by the description of the row driver circuit 60 operation, all of the terminal voltages (arrows 1-7) of the transistors (Q1-Q6) within the row driver circuit 60 are less than or equal to the voltage supply 64.

Those of ordinary skill in the art will recognize that the numerical values used in this description are representative embodiments and are not used for the purposes of limitation. Although this invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A row driver circuit, comprising:
   a voltage supply;
   a boosted voltage supply comprising a voltage that is larger than the voltage supply by a boosted amount;
   a pre-driver operably coupled to the voltage supply and configured to generate a driver voltage that is at least the boosted amount above a reference voltage, wherein the pre-driver is further configured to receive an input signal;
   a first transistor operably coupled in series between a second transistor and a ground voltage, wherein a gate of the first transistor is configured to receive the input signal, wherein the second transistor is operably coupled in series between the first transistor and an output signal, wherein the second transistor is configured to conduct and generate a drain-to-source voltage drop of at least the boosted amount; and
   a third transistor operably coupled between the boosted voltage supply and the output signal, wherein a gate of the third transistor is configured to receive the driver voltage.

2. The row driver circuit of claim 1, wherein the reference voltage is equal to the ground voltage.

3. The row driver circuit of claim 1, wherein the first transistor and the second transistor are NMOS transistors.

4. The row driver circuit of claim 1, wherein the third transistor is a PMOS transistor.

5. The row driver circuit of claim 1, wherein the pre-driver is further configured to receive a second input signal configured as a logical opposite of the input signal.

6. The row driver circuit of claim 1, wherein the pre-driver comprises a second PMOS transistor in series with a third PMOS transistor, a drain of the second PMOS transistor operably coupled to the ground voltage, the source of the third PMOS transistor operably coupled to the voltage supply.

7. The row driver circuit of claim 1, wherein the first, second and third transistors include a plurality of terminal voltages between any two terminals of a gate, a source, and a drain, wherein each of the plurality of terminal voltages is less than or equal to the voltage supply.

8. The row driver circuit of claim 1, wherein the input signal is selected from the group consisting of row select, reset and transfer.

9. A method of operating a row driver circuit, comprising:
   inputting a voltage supply to a pre-driver;
   inputting an input signal to the pre-driver;
   generating a driver voltage from the pre-driver that is at least a boosted amount above a reference voltage;
   generating an output signal, the generating comprising:
      inputting the input signal into a gate of a first transistor;
      supplying a boosted voltage to a source of a third transistor, a drain of the third transistor operably coupled to an output node;
      wherein the boosted voltage is larger than the voltage supply by the boosted amount;
      configuring a second transistor to conduct and generate a drain-to-source voltage drop of at least the boosted amount, the second transistor operably coupled to the output node; and
   operably coupling the driver voltage to a gate of the third transistor.

10. The method of claim 9, wherein the reference voltage is a ground voltage.

11. The method of claim 9, wherein the first, second and third transistors comprise a plurality of terminal voltages, wherein each of the plurality of terminal voltages is less than or equal to the voltage supply.

12. The method of claim 9, wherein generating a driver voltage comprises generating a voltage that is between a voltage substantially near a threshold voltage of a p-channel transistor and a voltage substantially near the voltage supply.

13. The method of claim 9, further comprising inputting a second input signal configured as a logical opposite of the input signal.

14. The method of claim 9, wherein inputting the input signal comprises inputting a signal selected from the group consisting of row select, reset and transfer.

15. A method of operating a row driver circuit, comprising:
   inputting a voltage supply to a pre-driver;
   inputting an input signal to the pre-driver;
   generating a driver voltage from the pre-driver that is at least a boosted amount above a ground voltage;
   generating a boosted voltage on an output signal when the input signal is negated;
   generating a voltage that is substantially near the ground voltage on the output signal when the input signal is asserted; and
   transitioning the output signal between a first voltage state and a second voltage state responsive to the driver voltage, wherein the driver voltage is independent from the output signal.

16. A method of operating a row driver circuit, comprising:
   inputting a voltage supply to a pre-driver;
   inputting an input signal to the pre-driver;
   generating a driver voltage from the pre-driver that is at least a boosted amount above a reference voltage;
   generating a boosted voltage on an output signal when the input signal is negated by adjusting the boosted voltage by the boosted amount;
   generating a voltage that is substantially near a ground voltage on the output signal when the input signal is asserted; and
   transitioning the output signal between a first voltage state and a second voltage state responsive to the driver voltage, wherein the driver voltage is independent from the output signal.

17. The method of claim 16, further comprising inputting a second input signal configured as a logical opposite of the input signal.

18. A method of operating a row driver circuit, comprising:
   inputting a voltage supply to a pre-driver;
   inputting an input signal to the pre-driver;
   generating a driver voltage from the pre-driver that is at least a boosted amount above a reference voltage, wherein the driver voltage is between a voltage substantially near a threshold voltage of a p-channel transistor and a voltage substantially near the voltage supply;
   generating a boosted voltage on an output signal when the input signal is negated;
   generating a voltage that is substantially near a ground voltage on the output signal when the input signal is asserted; and transitioning the output signal between a first voltage state and a second voltage state responsive to the driver voltage, wherein the driver voltage is independent from the output signal.

19. The method of claim 18, wherein inputting the input signal comprises inputting a signal selected from the group consisting of row select, reset and transfer.

20. An image sensor device, comprising:
an array of pixels arranged on a semiconductor device, wherein each pixel is configured for sensing light incident on the pixel;
a row driver circuit, comprising:
a voltage supply;
a boosted voltage supply comprising a voltage that is larger than the voltage supply by a boosted amount;
a pre-driver operably coupled to the voltage supply and configured to generate a driver voltage that is at least the boosted amount above a reference voltage, wherein the pre-driver is further configured to receive an input signal;
a first transistor operably coupled in series between a second transistor and a ground voltage, wherein a gate of the first transistor is configured to receive the input signal, wherein the second transistor is operably coupled in series between the first transistor and an output signal, wherein the second transistor is configured to conduct and generate a drain-to-source voltage drop of at least the boosted amount;
a third transistor operably coupled between the boosted voltage supply and the output signal, wherein a gate of the third transistor is configured to receive the driver voltage; and
a plurality of buses, each bus coupled to the pixels in a row of the pixel array and configured to carry the output signal.

21. The image sensor device of claim 20, wherein the reference voltage is equal to the ground voltage.

22. The image sensor device of claim 20, wherein the first transistor and the second transistor are NMOS transistors.

23. The image sensor device of claim 20, wherein the third transistor is a PMOS transistor.

24. The image sensor device of claim 20, wherein the pre-driver is further configured to receive a second input signal configured as a logical opposite to the input signal.

25. The image sensor device of claim 20, wherein the pre-driver comprises a second PMOS transistor in series with a third PMOS transistor, a drain of the second PMOS transistor operably coupled to the ground voltage, a source of the third PMOS transistor operably coupled to the voltage supply.

26. The image sensor device of claim 20, wherein the first, second and third transistors include a plurality of terminal voltages between any two terminals of a gate, a source, and a drain, wherein each of the plurality of terminal voltages is less than or equal to the voltage supply.

27. The image sensor device of claim 20, wherein the input signal is selected from the group consisting of row select, reset and transfer.

* * * * *